United States Patent Office 2,725,981
Patented Dec. 6, 1955

2,725,981

HIGH-TEMPERATURE MASKING TAPE

Joseph F. Abere, White Bear Township, Ramsey County, and Ambrose F. Schmelzle and Henry W. Murray, St. Paul, Minn., assignors to Minnesota Mining & Manufacturing Company, St. Paul, Minn., a corporation of Delaware No Drawing. Application May 4, 1953,
Serial No. 352,962

8 Claims. (Cl. 206—59)

This invention relates to a novel type of pressure-sensitive adhesive masking tape having the unusual property of being commercially useful for temporarily masking the surfaces of metal articles that are subsequently enamelled and then baked at high temperatures (e. g., 250–400° F.). Following the baking, the present tape can be easily and cleanly removed because the paper backing has not been embrittled, and the adhesive retains sufficient cohesive strength and anchorage to the backing to come away clean instead of offsetting and leaving a residue adhered to the surface. Ordinary masking tapes cannot be satisfactorily employed, even if provided with suitable adhesives, because the paper backing is deteriorated and made brittle by the high temperature heating to such an extent that it breaks when removal is attempted, and the adhesive transfers or offsets.

We have discovered that a commercially useful masking tape for drastic high temperature usage can be provided when the creped paper backing has been unified by impregnation with a low molecular weight copolymer of butadiene and acrylonitrile, vulcanized in situ, as more fully described hereafter.

The high-temperature masking tape problem is particularly difficult in the case of articles made of aluminum, magnesium, and alloys of these metals, which have been given an anti-corrosion treatment by an anodizing process. Anodizing is an electrolytic process wherein the article is made the anode in a bath of chromic acid or sulfuric acid to provide a porous corrosion-resistant surface film, following which a dip in warm or hot water is sometimes used to seal the pores of the film. The resultant anodized surface has a strong tendency to hold the adhesive of applied masking tape when subjected to high temperatures, due in part to its porosity and in part to its specific adhesion characteristic, so that subsequent removal of the tape is made more difficult. The more tightly the tape is bonded, the greater the force required to strip it away, and hence the greater the force tending to cause breaking or tearing of the tape backing, and the greater the force tending to cause adhesive transfer. If the backing has been deteriorated and embrittled by the high temperature heating, it is impossible to strip the tape off. It breaks and tears and must be removed bit by bit. Moreover, adhesive transfer is accentuated both because of the force of adhesion to the surface and because of reduced strength of anchorage to the deteriorated backing. Adhesive transfer results in adhesive being left on the surface and this has to be cleaned off. It has been found that certain tapes that are reasonably satisfactory when used on other types of surfaces, will fail to perform satisfactorily when used on anodized metal surfaces, even when baking temperature conditions are identical.

Thus the present invention has particular commercial value in providing a masking tape that can be used on anodized alloys of aluminum and magnesium that are subjected to high temperature baking of enamel coatings and the like.

The commercial value of this new masking tape is not limited to the above use. It also performs in a satisfactory way as a high-temperature tape when used on metal surfaces of other kinds, including surfaces resulting from non-electrolytic bonderizing, phosphating, dichromating and pickling treatments.

Masking tapes, supplied in roll form, have been commercially used on a large scale for many years. The backing is a porous creped paper, similar to towelling paper, that is impregnated and unified by a flexible and stretchable composition that binds the fibers together, so as to unify and strengthen the paper, and also provides a barrier to penetration by lacquer solvents and the like. The back surface is commonly given a thin coating of shellac or a synthetic resin to reduce the force required to unwind the tape, this coating being termed a backsize. The backing is coated on its face side with a normally tacky and pressure-sensitive rubbery-base adhesive, that is, an adhesive that is aggressively tacky in its normal state at normal temperatures, so that the tape adheres to surfaces upon mere finger pressing without need of heating or moistening, and can be removed from most surfaces without off-setting or transfer of adhesive. Such masking tapes are widely used in connection with painting operations to mask various surface areas from the applied paint, lacquer, varnish or enamel, and following drying or curing the tape is stripped off. The unified creped paper backing, as well as the adhesive, has a "dead stretch" (as distinguished from a "live stretch" such as that of rubber bands) and this permits easy conformation to curved or irregular surfaces, and permits the tape to be applied so as to define a curved masking edge when desired.

The impregnants commonly used for saturating and unifying the creped paper backing have been of two types. The first type is essentially a fluxed blend of broken down rubber (natural or synthetic), compatible thermoplastic tackifier resin (such as rosin), and zinc oxide, applied as a solution in a hydrocarbon solvent. The second type is a synthetic rubbery polymer applied as a solution in an organic solvent or, more commonly, as an aqueous dispersion or latex. Tests made on a wide variety of commercial and experimental masking tapes having backings of these types, demonstrated that these tapes did not perform satisfactorily as high-temperature masking tapes, especially when applied to anodized surfaces and subjected to high temperature baking cycles as employed in industry.

This was also true when the paper was impregnated with rubbery copolymers of butadiene and acrylonitrile (Buna N rubbers), or butadiene and styrene (Buna S or GR-S rubbers).

We have discovered that if, instead of impregnating the paper with a rubbery Buna N copolymer (which is a high molecular weight copolymer), the paper is impregnated with a low molecular weight copolymer of butadiene and acrylonitrile, having an intrinsic viscosity in a certain range, and this copolymer is suitably heat vulcanized in situ in the paper, a masking tape product can be provided which has the necessary high temperature performance characteristics as well as the other properties required for a commercially desirable masking tape.

The low molecular weight copolymers of butadiene and acrylonitrile employed in making the present tape backing are non-rubbery plastic viscid masses. The monomer ratio should be in the range of approximately 50:50 to 80:20 (i. e. 50 to 80 parts by weight of butadiene and, correspondingly, 50 to 20 parts of acrylonitrile); the preferred range being 50:50 to 65:35. A preferred species has a 60:40 ratio of butadiene to acrylonitrile. The "intrinsic viscosity" serves as a convenient indication of the molecular weight range and softness of the copolymer. It has been found that for present purposes the copolymer should have an intrinsic viscosity in the range of approximately 0.2 to 0.6; the preferred range being 0.25 to 0.45. A preferred species of the above-mentioned 60:40 copolymer has an intrinsic viscosity of 0.32 to 0.42. The intrinsic viscosity is determined (in a way well known to polymer chemists) from the measured viscosity of a dilute solution of the copolymer in methyl ethyl ketone solvent. Direct comparison cannot be made with the high molecular weight copolymers of butadiene and acrylonitrile (Buna N rubbers) because they are insoluble in the solvent and produce gelling. However, the low magnitude of intrinsic viscosity of the present copolymers can be appreciated from the fact that a typical GR–S rubber with a Mooney value of 50, has an intrinsic viscosity of 2.0 to 2.5.

The copolymer can be prepared by emulsion polymerization of butadiene and acrylonitrile, using a mercaptan chain transfer agent to obtain the desired low molecular weight. The copolymer latex is coagulated and dried when the copolymer is to be applied in solution form.

The paper is impregnated with a solution of the copolymer in a suitable volatile solvent (such as a mixture of xylol and n-butyl alcohol), or with an aqueous dispersion or latex of the copolymer, that contains a vulcanizing agent, so that the copolymer can be vulcanized in situ in the paper following saturation and drying. The resultant cured copolymer is the impregnant and unifying composition present in the backing of the tape product. The curing process inevitably leaves a residual unreacted portion of the vulcanizing agent mixed with the cured copolymer and this is available to cause additional curing when the tape product is subjected to high temperature heating in use, thus further helping to minimize deterioration.

The two types of vulcanizing agent that have been found particularly suitable are the thiuram polysulfide type and the phenol-aldehyde resin type, each of which is used in conjunction with an activator (such as zinc oxide or zinc resinate). They can be used individually or in combination.

The thiuram polysulfide vulcanizing agents are illustrated by "Tetrone–A" (dipentamethylene-thiuramtetrasulfide) and "Tuads" (tetramethyl-thiuramdisulfide) and are well known to rubber chemists. These compounds apparently liberate a nascent form of sulfur during the vulcanization process, and also act as accelerators, so that a good cure can be obtained with time-temperature combinations that do not break down the copolymer nor embrittle the paper. The proportion of such vulcanizing agent should be in the range of approximately 1 to 6% by weight based on the copolymer (i. e. 1 to 6 parts per 100 parts of the copolymer), and a preferred proportion of "Tetrone–A" is 4%.

The phenol-aldehyde resin vulcanizing agents constitute the well-known sub-class of oil-soluble heat-advancing phenol-aldehyde resins, being so composed that they are both soluble in varnish oils and harden upon heating. It is well known that these resins react with rubber upon heating together and produce a firming or stiffening of the mass—hence they are commonly classed as rubber vulcanizing agents in the broad sense of the term. These resins are most commonly formed of a para-substituted phenol (such as para-tertiary-amyl, para-tertiary-butyl, and para-phenyl phenol) reacted with formaldehyde in excess over the equimolecular quantity and in the presence of an alkaline catalyst. A well known commercial example is "Bakelite BR–14,634." The proportion of such vulcanizing phenol-aldehyde resin should be in the range of approximately 5 to 40% by weight based on the copolymer, and the preferred range is about 10 to 20%.

With either type of vulcanizing agent, an activator or catalyst is used to speed the reaction and decrease the curing temperature. The use of vulcanization activators is too well known to need detailed discussion. Zinc oxide is a preferred example and as little as 1% will serve the catalytic function, but a higher proportion (e. g., about 10%) is desirable to also provide a reinforcing pigment. Curing can be conveniently effected by oven heating for about 5 to 10 minutes at a temperature of about 300° F.

Modifying agents can be included in the impregnating composition. For example, when a thiuram polysulfide vulcanizing agent is used, it has been found advantageous to include about 5 to 50% (based on the copolymer) of an oil-insoluble (spirit-soluble) heat-advancing type of phenol-aldehyde resin, as illustrated by "Durez No. 175."

The present tape must be provided with a high-temperature resistant type of pressure-sensitive adhesive. These are known to the art and do not per se constitute a part of this invention, but their combination with the novel backing of this invention makes possible a tape product having the desired high temperature performance characteristics. In this connection it should be emphasized that the present backing impregnant is important in relation to the adhesive, for it permits the adhesive to withstand high temperatures without softening and oozing or resinifying. The residual vulcanizing agent in the backing exerts a protective action on the adhesive which it contacts and into which it can migrate. In contrast, a backing would not be suitable, no matter how temperature-resistant in the absence of the adhesive, if it adversely affected the adhesive coating. And conversely, a feature of the present backing is that known temperature-resistant adhesives can be used without adversely affecting the backing impregnant.

The high-temperature resistant pressure-sensitive tape adhesives referred to above include a rubbery synthetic polymer base (such as a GR–S rubber) that has been cured or vulcanized to obtain heat-resistance. The vulcanizing process leaves a residue of unreacted vulcanizing agent which is available to cause further vulcanization when the tape in use is subjected to heating, thereby offsetting the tendency of the polymer to break down and become soft or pasty and ultimately resinify. A tackifier resin (and often an oily plasticizer) is included to obtain the necessary degree of tackiness.

By starting with a low molecular weight vulcanizable polymer, subsequent vulcanization results in a vulcanized polymer having the desired degree of firmness, stretchiness, elasticity and cohesive strength, and in such cases a tackifier resin is not needed (or can be used in a smaller proportion) if the low molecular weight polymer has adequate inherent tackiness after it has been vulcanized. The low molecular weight polymer may be a rubbery polymer (such as GR–S rubber) that has been broken down by mechanical working or by heating or chemical action to a plastic or liquid state; or it may be synthetic polymer capable of forming a rubbery mass when highly polymerized or vulcanized, which has however only been polymerized to an intermediate low molecular weight state (such as a low molecular weight butadiene-styrene polymer). This general principle was described in Kellgren Patent No. 2,410,079 (Oct. 29, 1946).

The preferred vulcanizing agents (used with an activator, such as zinc oxide or the zinc resinate reaction product of zinc oxide and rosin or ester gum) are the previously mentioned oil-soluble heat-advancing phenol-aldehyde resins.

*Example*

This example describes in some detail the making of the presently preferred embodiment of the present masking tape invention. This construction has been manufactured and used on a substantial commercial scale and has proved its value under the conditions of actual industrial usage.

The paper backing is a bibulous creped kraft paper having a ream weight of 27 lbs. (weight of 320 square yards), commonly used in manufacturing masking tapes. Special types of paper are not required, which is a feature of the invention. It is saturated with an impregnating solution having the following formulation so as to provide an impregnant weight (dry solid basis) of about 70 grains per square foot. All parts are by weight.

|  | Parts |
|---|---|
| Butadiene-acrylonitrile polymer (low molecular weight 60:40 type having intrinsic viscosity of 0.32-0.42) | 100 |
| Zinc oxide | 10 |
| Xylol | 83 |
| N-butyl alcohol | 28 |
| Phenol-aldehyde resin (oil-insoluble heat-advancing type, such as "Durez No. 175" dissolved in equal weight of methyl isobutyl ketone) | 15 |
| Dipentamethylene - thiuram - tetrasulfide (such as "Tetrone-A" as a 60% solution in paraffin oil) | 4 |

These ingredients, other than the last one, are thoroughly blended by mixing in a heavy duty internal mixer (such as a "Mogul Mixer"). The vulcanizing agent (last ingredient of the formula) is mixed in shortly before use to avoid gelling.

The saturated paper is passed through an oven where it is first heated at 240° F. for 3 minutes to evaporate the solvent and then at 275° F. for 10 minutes to cure (vulcanize) the polymer impregnant.

The impregnated paper is then provided with a thin non-thermoplastic resin backsize coating that facilitates unwinding of the adhesive tape product but which does not become soft or sticky when the tape is heated. The type employed in this example is described in Kellgren Patent No. 2,548,980 (April 17, 1951), and more specifically is a heat-reactive alcohol-soluble urea-formaldehyde-butyl alcohol resin blended with 25% of a castor oil-modified alkyd resin plasticizer and applied from solution in an alcoholic solvent. The coated backing is heated for 5 minutes at 290° F. to evaporate the solvent and cure the backsize, which is thereby converted from an alcohol-soluble to an alcohol-insoluble condition, and to provide further curing of the polymer impregnant.

The backing is then coated on the face side with an aqueous casein/latex type of primer solution consisting of:

|  | Parts |
|---|---|
| Casein | 9 |
| GR-S synthetic rubber latex (38% solids) | 200 |
| Ammonium hydroxide (28% NH3) | 4 |
| Beta-naphthol | 0.3 |
| Ethyl alcohol | 1 |
| Water | 176 |

The coated backing is dried by passing around a steam-heated drum drier.

The backing is then given a low-adhesion backsize by being coated on the back with a 5% solution in toluene of a copolymer of octadecyl acrylate and acrylic acid (3:2 weight ratio), followed by drying on a steam-heated drum drier. This type of low-adhesion backsize is described in Hendricks Patent No. 2,607,711 (Aug. 19, 1952).

The finished backing is then coated on the primed face side with an adhesive solution having the following formulation:

|  | Parts |
|---|---|
| Buna S rubber ("GR-S 1011" having a Mooney value of 50-75 and a butadiene:styrene ratio of 76.5:23.5) | 100 |
| Zinc oxide | 50 |
| Rosin ester tackifying resins (30 parts pentaerythritol ester of wood rosin, such as "Pentalin A," and 40 parts ethyleneglycol ester of partially hydrogenated wood rosin, such as "Staybelite Ester No. 1") | 70 |
| Paraffin oil plasticizer | 30 |
| Phenol-aldehyde vulcanizing resin (oil-soluble heat-advancing type, such as "Bakelite BR-14,634") | 12 |
| Heptane | 384 |
| Ethyl alcohol | 20 |

The GR-S rubber and zinc oxide are milled together and then mixed with the resins and oil in a warm heavy duty internal mixer until homogeneous. Steam is then introduced into the heating jacket to a pressure of about 80 lbs. gauge (producing a jacket temperature of about 325° F.) and mixing is continued for 45 to 60 minutes, causing the phenol-aldehyde vulcanizing resin to cure the GR-S rubber. The mix is then cooled to about room temperature by passing cooling water through the jacket and adding Dry Ice (solid $CO_2$) to the mix. The solvents (heptane and alcohol) are added with continued mixing until a homogenous solution is obtained. This adhesive solution is coated on the backing, followed by oven drying to remove the solvent.

The coated backing is then slit and wound into rolls of desired size to provide the completed adhesive tape product.

Tapes made in this way will have the following typical physical properties: A lengthwise tensile strength of 20 lbs./inch width, an elongation at break of 9%, and a caliper thickness of 8 mils. The particular adhesive coating is normally tacky and pressure-sensitive but it has a lower degree of tack than is customary in conventional masking tapes, so as to avoid too high a "grab" when applied to anodized aluminum surfaces, the latter being porous.

Laboratory tests of the tape on anodized aluminum test panels show that this type of tape can stand the following heating cycles and be cleanly stripped off:

| Baking Temperature (° F.): | Time |
|---|---|
| 300 | 8 hours |
| 325 | 4 hours |
| 350 | 90 minutes |
| 375 | 45 minutes |
| 400 | 15 minutes |

A striking demonstration of the high-temperature resistance of the present backing and tape is provided by heating test strips of 15 mm. width at 350° F. for one hour and then measuring the folding resistance at a tension of 1 kg. by using the well known M. I. T. Folding Endurance Tester (made by Tinius Olsen Testing Machine Co., Willow Grove, Penn.) to determine the number of times the strip can be double-folded before breaking. Various lots of tape made at different times as described above have given values consistently in the range of 2,000 to 3,000 double folds. In contrast, the most widely used conventional masking tapes (manufactured by Minnesota Mining & Manufacturing Company) give values of 10 to 170 double folds when similarly exposed to 350° F. for one hour, although the normal tapes fresh from the roll give an average value of 1,400 to 4,500 double folds.

Although this invention pertains especially to masking tapes having creped paper backings, the novel principle has useful application to tapes having non-creped fibrous backings of paper, cloth or felted fibers, and the backing need not be composed of cellulosic fibers but may consist in whole or part of other paper-making or textile fibers, including glass fibers, filaments and yarns. Pressure-sensitive adhesive tapes can be made with utilization of present principles which are not intended for high-temperature usage but for other usages for which they have special value on account of one or more properties. The present backing has exceptionally good outdoor-exposure resistance and high resistance to lacquer solvents.

We claim:

1. A high-temperature adhesive masking tape wound upon itself in roll form and adapted for use on anodized aluminum articles subjected to high baking temperatures, having a unified creped paper backing coated with a high-temperature resistant pressure-sensitive adhesive, characterized by the fact that the paper backing is impregnated with a unifying composition essentially consisting of a low molecular weight copolymer of butadiene and acrylonitrile having an intrinsic viscosity in the range of approximately 0.2 to 0.6, the butadiene:acrylonitrile ratio being in the range of approximately 50:50 to 80:20 by weight, and which has been heat vulcanized in situ after impregnation.

2. A masking tape according to claim 1 wherein said copolymer has been heat cured in situ with a thiuram polysulfide vulcanizing agent in the proportion of approximately 1 to 6% by weight.

3. A masking tape according to claim 1 in which said adhesive is a high-temperature resistant rubbery base pressure-sensitive adhesive wherein the rubbery component is mainly a butadiene-styrene copolymer vulcanized with an oil-soluble heat-advancing phenol-aldehyde resin.

4. A high-temperature adhesive masking tape wound upon itself in roll form and adapted for use on anodized aluminum articles subjected to high baking temperatures, having a unified creped paper backing coated with a high-temperature resistant pressure-sensitive adhesive, characterized by the fact that the paper backing is impregnated with a unifying composition essentially consisting of a low molecular weight copolymer of butadiene and acrylonitrile having an intrinsic viscosity of 0.25 to 0.45, the butadiene-acrylonitrile ratio being 50:50 to 65:35 by weight, and an oil-insoluble heat-advancing phenol-aldehyde resin in the proportion of 5 to 50% by weight, and which has been heat cured in situ with a thiuram polysulfide vulcanizing agent in the proportion of 1 to 6% by weight.

5. A masking tape according to claim 4 in which said adhesive is a high-temperature resistant rubbery base pressure-sensitive adhesive wherein the rubbery component is mainly a butadiene-styrene copolymer vulcanized with an oil-soluble heat-advancing phenol-aldehyde resin.

6. A pressure-sensitive adhesive tape having a unified fibrous backing coated with a pressure-sensitive adhesive, characterized by the fact that the backing is impregnated with a unifying composition essentially consisting of a low molecular weight copolymer of butadiene and acrylonitrile having an intrinsic viscosity in the range of approximately 0.2 to 0.6, the butadiene:acrylonitrile ratio being in the range of approximately 50:50 to 80:20 by weight, and which has been heat vulcanized in situ after impregnation.

7. An adhesive tape according to claim 6 wherein said copolymer is vulcanized with a thiuram polysulfide vulcanizing agent in the proportion of about 1 to 6% by weight.

8. An adhesive tape according to claim 6 in which said adhesive is a high-temperature resistant rubbery base pressure-sensitive adhesive wherein the rubbery component is mainly a butadiene-styrene copolymer vulcanized with an oil-soluble heat-advancing phenol-aldehyde resin.

References Cited in the file of this patent

UNITED STATES PATENTS

| | | |
|---|---|---|
| 2,379,552 | Toppema | July 3, 1945 |
| 2,405,038 | Jennings | July 30, 1946 |
| 2,459,874 | Fay | Jan. 25, 1949 |
| 2,535,852 | Hatfield | Dec. 26, 1950 |
| 2,592,550 | Engel | Apr. 15, 1952 |
| 2,647,843 | Bemmels | Aug. 4, 1953 |
| 2,647,848 | Douglas | Aug. 4, 1953 |